United States Patent [19]

Orr

[11] Patent Number: 4,864,190
[45] Date of Patent: Sep. 5, 1989

[54] VDT SCREEN

[75] Inventor: Alfred T. Orr, Toronto, Canada

[73] Assignee: Ancile Inc., Brampton, Canada

[21] Appl. No.: 60,144

[22] Filed: Jun. 10, 1987

[30] Foreign Application Priority Data

Jun. 10, 1986 [CA] Canada .................................. 511267

[51] Int. Cl.$^4$ ........................ H04N 5/65; H01J 29/89
[52] U.S. Cl. .................................... 313/478; 358/252; 358/253
[58] Field of Search .................. 313/478, 479; 315/85; 358/250, 252, 253, 245, 247, 254, 255

[56] References Cited

U.S. PATENT DOCUMENTS

| | | | |
|---|---|---|---|
| 3,431,454 | 3/1969 | Sanders | 315/85 X |
| 4,404,615 | 9/1983 | Dep | 361/212 |
| 4,412,255 | 10/1983 | Kuhlman et al. | 358/252 X |
| 4,504,867 | 3/1985 | Keller | 358/252 X |
| 4,586,106 | 4/1986 | Frazier | 361/212 |
| 4,602,310 | 7/1986 | Fenster | 361/212 |
| 4,633,324 | 12/1986 | Giulie | 358/252 X |
| 4,692,809 | 9/1987 | Beining et al. | 340/712 X |

FOREIGN PATENT DOCUMENTS

| | | | |
|---|---|---|---|
| 810271 | 4/1969 | Canada | 250/16 |
| 812304 | 5/1969 | Canada | 250/16 |
| 1211784 | 9/1986 | Canada | 317/9 |
| 1213967 | 11/1986 | Canada | 347/7 |
| 1219629 | 3/1987 | Canada | 317/3 |
| 1224522 | 7/1987 | Canada | 317/3 |

Primary Examiner—David K. Moore
Assistant Examiner—K. Wieder
Attorney, Agent, or Firm—Rogers & Scott

[57] ABSTRACT

The invention provides a structure for reducing potentially harmful effects emanating from a video display terminal having a screen on a cathode ray tube. The structure includes a light-transparent first medium proportioned to cover the screen and being of a material capable of absorbing ionizing radiation. An electrically conductive second medium is also proportioned to cover the screen and is sufficiently light transparent to permit normal viewing of visual displays on the screen. The second medium reacts with non-ionizing radiation to dissipate this radiation and a frame is provided to hold the first and second mediums. The frame includes a discharge connection for coupling the second medium to ground to dissipate a charge in use in the second medium.

14 Claims, 3 Drawing Sheets

U.S. Patent    Sep. 5, 1989    Sheet 3 of 3    4,864,190
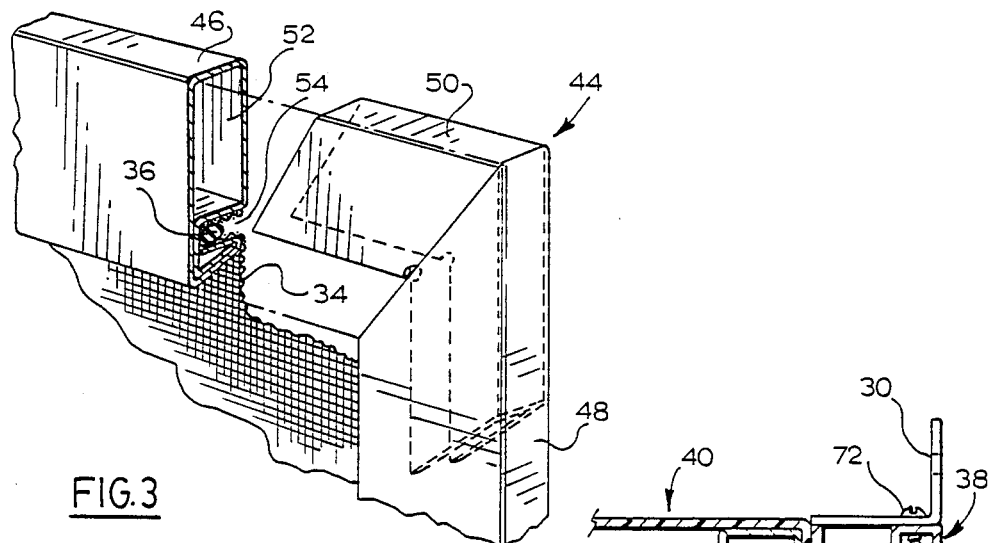
FIG.3
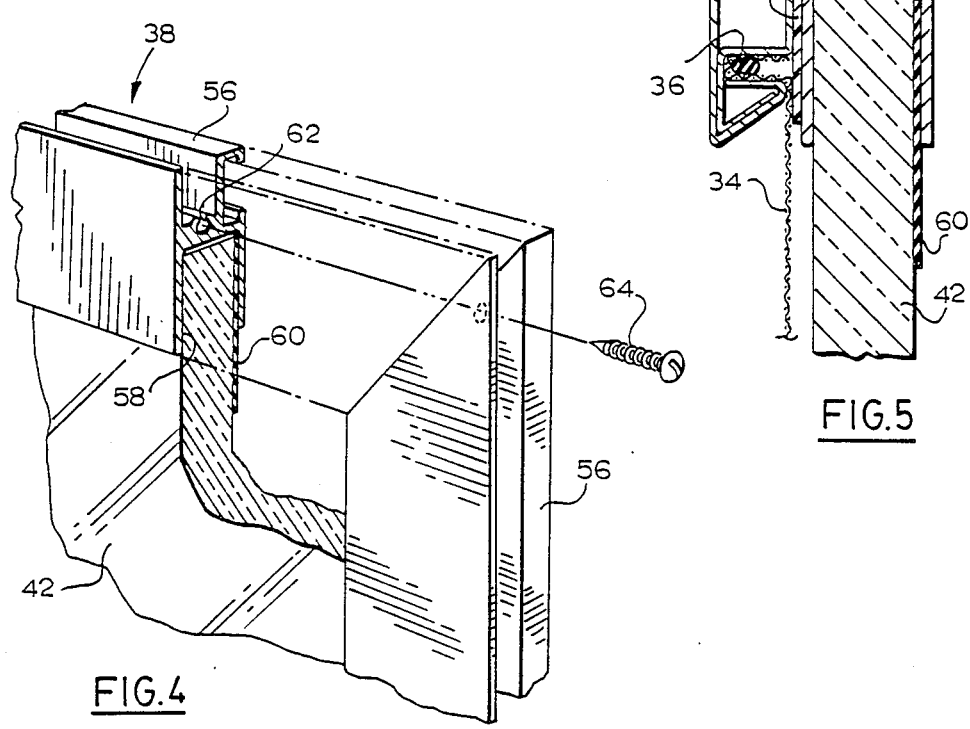
FIG.4
FIG.5

VDT SCREEN

This invention relates to video display terminals (VDT) used as peripheral devices in data processing and word processing systems, and more particularly to a structure for use with such terminals to reduce the risk of health hazards and to improve the characteristics of the video display to minimize user tiredness, eye strain and the like.

For the purposes of the present application, a video display terminal (which will be referred to hereinafter by the acronym VDT) is intended to include all television-like devices used to display information on a cathode ray tube screen. Such devices exist as peripherals in computing systems, as word processing terminals, and in general, wherever data processing requires human-readable input and output in one device.

The uses for VDTs is growing as offices move towards electronic transfer of data and information and the storage of records electronically on media such as hard disc memories. Operators tend to become dependent on VDTs to the point where they are used to the exclusion of typewriters and other manual systems involving the use of paper. This swing towards the use of VDTs in recent years is growing in momentum and has resulted in operators who spend most of their working days sitting in front of a VDT making use of its capabilities.

There has always been some suggestion that cathode ray tubes produce radiation which is detrimental to health. Initially there was concern for television viewers. It was then found that because the viewer sits so far away from the cathode ray tube, and because any radiation is dispersed as the square of the distance from the television, the viewer is not subject to any noticeable radiation effect. It is now acceptable for viewers to watch televisions on a daily basis without any physiological side effects although with the advent of higher powered colour television sets, viewers are discouraged from sitting close to the screen. Also, the long term effect of radiation from television watching is likely to cumulative and there has been no meaningful analysis of the long term effect of this radiation on humans.

The advent of VDTs caused the question of radiation to be raised again. Initially the question was related to television usage and by analogy it was agreed that because the output of VDTs is significantly less than that of a colour television set, it could be treated as a television set and was, therefore quite safe. However, there are differences. Television watchers will not normally use the television set for as many hours a day as will an operator of a VDT. Further the VDT operator sits within a short distance of the cathode ray tube and is therefore in a zone where any radiation from the VDT would be of much greater intensity than that received in a zone normally occupied by a television viewer. Because of these considerations, many studies have been done to determine whether or not VDT radiation is a health hazard to the operator.

It is well known that VDTs produce several types of electromagnetic radiation. X-rays and gamma rays are produced within the cathode ray tube by the action of the electron gun and when the electrons impact on the phosphor coating on the inside of the screen, ultraviolet, visible, and infrared radiation is emitted. Also, microwaves and radio-frequency radiation may be produced by certain designs. The range of electromagnetic radiation varies from the very high frequency X-rays and gamma rays to low frequencies in the radio wave band. The electro-magnetic spectrum is normally subdivided into named arbitrary frequency ranges although of course the divisions between the ranges are approximations with some overlapping. At the high end are the gamma and X-rays which are classified generally as "ionizing radiation" and then the "non-ionizing" radiations which, following from the gamma and X-rays and high end ultraviolet radiation, are lower level ultraviolet radiation, visible radiation, infrared radiation, microwaves, and radio frequencies.

The biological effects produced by ionizing radiation are different from those produced by non-ionizing radiation. It is generally acknowledged that the effects vary according to factors such as the frequencies and wave lengths of the radiation, the strength of the source, and the distance of the recipient from the source. Of course, one further aspect may well be how long and how often the recipient is in a position to receive the radiation.

At very high frequencies there is enough energy in the gamma and X-rays to dislodge electrons creating ionization and irreversible damage to human molecules, and particularly DNA molecules. This effect extends into the higher range of the ultraviolet radiation whereas visible light contains insufficient energy to dislodge electrons permanently from an atom, although electrons will be moved from one orbit to another causing energy changes but without permanent molecular damage. This excitation is essential for the mechanism of sight.

Infrared radiation is of lower frequency than visible light and contains even less energy. Infrared radiation is capable only of agitating the atoms to cause them to vibrate, and this vibration manifests itself in the form of heat. This however, is not the case with microwaves which, although of lower frequency, are capable of agitating water molecules causing heat with resulting changes to the molecules. Such microwave activity has to be considered a potential danger whereas the lower frequency radio waves are of sufficiently great wave length that they leave behind very little energy as they pass through the body and thus cause no measurable molecular damage.

Further considerations in relation to the use of VDTs include the effects of build up of static electricity, as well as the very low frequency pulsating magnetic field created by the so-called "fly-back" transformer associated with the electron gun scanning mechanism.

In the late 1970s and early 1980s studies were done to determine the magnitude of the various radiations emitted from VDTs because of reports that child malformations had been found at birth where the mother was a VDT operator. There were also complaints about cataracts, headaches, eye strain and other general discomforts.

With reference to the potential for damage to a fetus, on July 29, 1980 the City of Toronto, Canada, Department of Public Health, in a report entitled "Health Effects of Video Display Terminals", reviewed the matter and came to the conclusion that none of the various forms of radiation is sufficient to cause a problem for a user of a VDT, whether or not that user may be pregnant. The report discussed the various forms of radiation and identified how these initial radiations could affect the human body. Each radiation was considered in detail, but alone. The study did not address the possibility of long term effects of using VDTs, nor did it consider the possibility of combined or synergistic effects resulting from repeated and prolonged exposure to the total radiation of various types emitted by VDTs.

In the magazine "Science" in Vol. 212.5 of June 1981, there is an article on page 1120 entitled "FDA Sees No Radiation Risk in VDT Screen". The discussion in this article centres on the conclusion that there are no health problems associated with VDTs. However, the article also quotes an ophthalmologist named Milton Zaret who diagnosed the ailments of two young men who had developed cataracts as "radiant energy cataracts" caused by exposure to microwave emissions from VDTs. While other physicians disagreed, Mr. Zaret who is described as having a long and controversial career diagnosing radiant energy cataracts, remained unmoved by the expressions of doubt. In other words, there seemed to be disagreement among experts as of 1981 about the effects VDTs have on their users.

The controversy continued and then on Jan. 30, 1986 newspapers carried a report that Rickardo Edstrom, Chief Physician at the Swedish Occupational Safety Administration, had found that radiation from VDTs caused severe birth defects and even death among mice. Edstrom stated that the result was "totally unexpected" but carried on to indicate that there is a big step between experimentation with animals and humans. However, he added that the findings meant that "we can no longer rule out the possibility that radiation could affect fetuses".

In a further experiment, Polish scientists noted that mice kept very near to television screens (at a distance of 1 foot) also developed birth defects.

There is currently a developing body of scientific opinion, particularly in Europe and Scandinavia, which contends that the non-ionizing radiation may be more detrimental to both male and female operators than was previously recognized. In particular, prolonged and repeated exposure to non-ionizing radiation may be responsible for stress related problems such as nausea, headaches and cataracts. It is also being suggested that these problems may be related to the pulsating radiation caused by the fly-back transformer. Most importantly, these effects are now being considered as a result of VDT use as opposed to analysing each range of radiation independently.

We have seen from the foregoing that the early reviews concentrated on an analysis of the various forms of radiation and considered these forms independently. The concern expressed by Rickardo Edstrom is echoed by many medical practitioners. Edstrom demonstrated that a VDT (regardless of what the radiation it develops is) had an effect on mice which could conceivably be an indication that a VDT could be dangerous when used by pregnant women.

As a result of the uncertainty of the effect of VDTs on users, the Province of Ontario, Canada, along with other jurisdictions, has decreed that no pregnant woman is to be required to work as a VDT operator. As more further technical data is analysed and studies concluded, there is growing evidence of detrimental effects to VDT operators. This is becoming particularly significant in European countries where user comfort is stressed as a standard for the acceptability of VDTs in the workplace.

It is therefore an object of the present invention to provide a structure for use with a VDT which will absorb a variety of radiation energies to minimize the potential of effects on the users of VDTs.

Various other aspects of VDTs use can also bear scrutiny. For instance, it is well known that a VDT is capable of developing electrostatic charge and effects of this charge are being researched because there is considerable evidence of eye strain, fatigue and stress producing some behavioural effects on VDT operators. There is also a reported incidence of eye infections, colds, 'flu', and airborne infections being above normal when compared with those in the general office population. Although investigators have not yet agreed on the specific cause of these problems, there is considerable weight of argument to the effect that they are the result of effect of the static field surrounding the VDT because it tends to attract and concentrate airborne infections. It is therefore another object of this invention to provide a device for use with a VDT to minimize static charge build-up about the VDT.

Accordingly the invention provides a structure for reducing potentially harmful effects emanating from a video display terminal having a screen on a cathode ray tube. The structure includes a light-transparent first medium proportioned to cover the screen and being of a material capable of absorbing ionizing radiation. An electrically conductive second medium is also proportioned to cover the screen and is sufficiently light transparent to permit normal viewing of visual displays on the screen. The second medium reacts with non-ionizing radiation to dissipate this radiation and a frame is provided to hold the first and second mediums. The frame includes a discharge connection for coupling the second medium to ground to dissipate a charge in use in the second medium.

The invention also provides structures for dissipating pulsed electromagnetic radiation resulting from the operation of fly-back transformers. The invention will be better understood with reference to the following description, taken in combination with the drawings, in which:

FIG. 3 is a perspective view with a portion broken away of a corner of the front frame;

FIG. 4 is a view similar to FIG. 3 and showing a corner of the rear frame;

FIG. 5 is a sectional view on line 5—5 of FIG. 1; and

Figure 1:
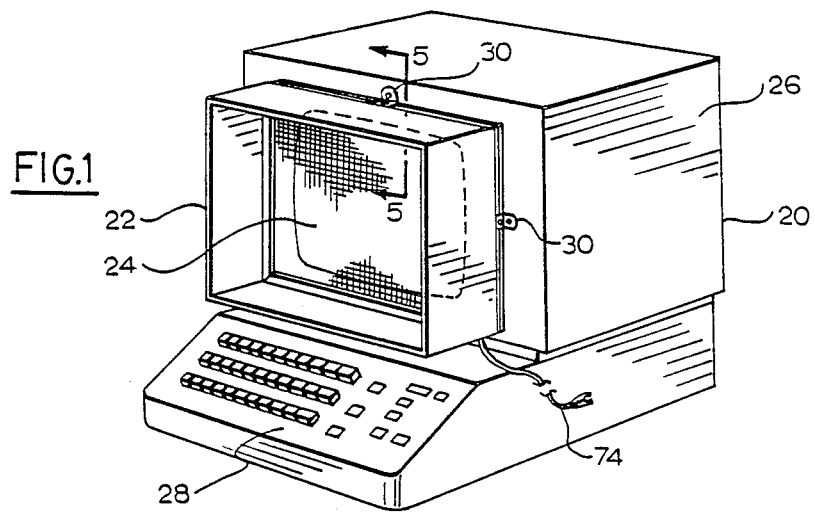
FIG. 1 is a perspective view of a typical VDT on which is mounted a preferred embodiment of structure according to the invention where the structure is to be added to an existing terminal.

Reference is made firstly to FIG. 1 which shows a typical VDT indicated generally by the reference numeral 20 to which is attached structure 22 according to the invention. The structure is a preferred embodiment when the invention is to be applied to an existing VDT but of course will be modified when it is integrated in the structure of a new VDT. As usual the VDT 20 includes a screen 24, forming part of a cathode ray tube, in a housing 26 and associated with a keyboard 28 which in this instance is a word processing keyboard. The structure 22 includes 3 attachment clips 30 (two of which are shown) and will be described in detail with reference to FIG. 2.

Figure 2:
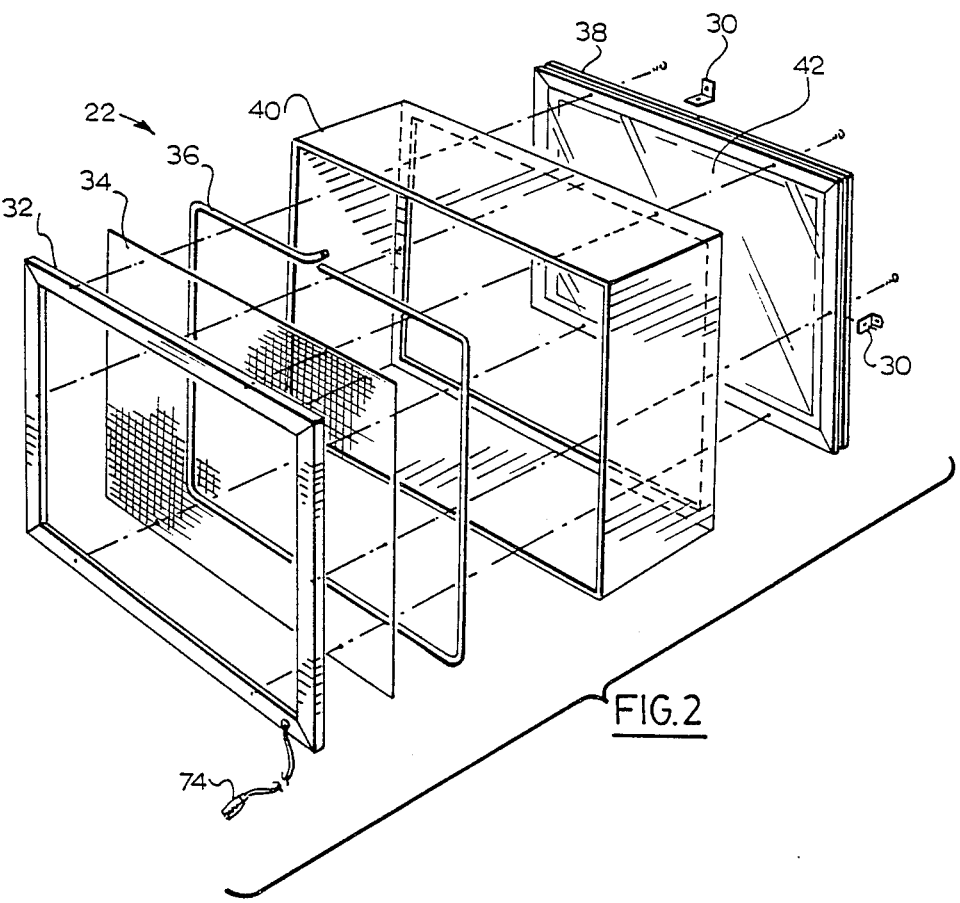
FIG. 2 is an exploded perspective view of the structure drawn to a scale larger than that used in FIG. 1 and including a front frame and a rear frame.

As seen in FIG. 2, the structure 22 consists of a front frame 32, screen 34 and attachment insert 36, rear frame 38, and a cowl 40 preferably of SAE 1010 steel having a thickness of about 0.0036 inches. The structure is such that the front frame 32 accommodates the screen 34 and the rear frame 38 accommodates a boron silicate glass insert 42 as will be described.

Reference is next made to FIG. 3 to describe in more detail the frame 32. The frame consists essentially of four peripheral elements meeting at mitred corners such as corner 44 where two of the elements 46, 48 are shown connected by a corner connector 50. There will of course be four corner connectors in order to complete the frame from four elements and these connectors are a frictional fit in a rectangular opening 52 extending longitudinally of the elements. As can be seen from the section of element 46, these elements are roll formed (preferably of aluminum) and include a rearwardly opening recess 54 containing the periphery of screen 34 which is held in place by the frictional engagement of the deformable strip 36.

The screen 34 is of stainless steel modified by ozidizing to be black, and is made up of fine wires, there being preferably 180 per lineal inch of a diameter of about 0.0018 inches although satisfactory results have been achieved using a range of 100 to 200 threads per inch with appropriate variations in wire diameter for good visibility. The effect of the screen on the visual clarity of displays on the screen 24 is to modify the glare without significantly affecting the readability of information on the screen.

Reference is next made to FIG. 4 which shows a portion of the rear screen 38 and is a view similar to FIG. 3. The rear screen consists of elements 56, preferably of extruded aluminum, and shaped to include a recess 58 extending continuously around the frame and containing the glass insert 42. A sealing gasket 60 is used to hold the glass insert in place. This glass insert is of boron silicate glass about 6 mm thick and can be tinted if necessary (or a tinting applied to it or attached to it). The elements 56 also include an outwardly facing rounded channel 62 used to receive screws 64 (one of which is shown) for attaching the elements at the corners of the frame 38. Evidently, other fasteners could be used alternatively or additionally as required.

As seen in FIG. 5, the front and rear elements are attached to one another by screws 66 (one of which is shown) and between these elements, an inwardly extending flange 68 of the cowl 40 is trapped so that the screws retain all of the elements together in an assembly of the structure. The heads of the screws 66 are contained in a rearwardly opening recess 70 and the assembly is completed by the addition of the L-shaped clips 30 which are attached to the elements 38 by self-tapping screws 72 which also extend into the recess 70.

The assembly of the structure has numerous effects both on the radiation emanating from the VDT and also on user acceptance in relation to such things as eye strain. Ionizing radiation is dissipated by the boron silicate glass insert 42 although visible radiation will pass through to the user. The very fine screen 34, because of its electrical conductivity and attachment to the elements 46, will be induced by non-ionizing radiation in the low frequency range to conduct a charge thereby dissipating this radiation. This charge is grounded by a ground strap or connector 74 (FIGS. 1 and 2) attached to any convenient ground point adjacent the VDT. Also, the screen will dissipate any static build-up and the user can also avoid static charge by touching the screen occasionally to dissipate any charge built up as a result of the user moving and rubbing clothing against chairs, etc.

The screen 34 also combines with the glass insert 42 to minimize glare from the VDT screen 24 (FIG. 1), and the cowl 40 sits in the very low frequency field created by the fly-back transformer to extend the magnetic path and induce charge as a result of the varying or pulsing field surrounding it. This charge is also dissipated via the ground strap 74 resulting in minimal effect about the VDT and associated with the user.

The fly-back transformer creates a pulse magnetic effect which in turn develops a very low intermittent magnetic field in the range of 1-10 hertz. This very low level of magnetic flux has been suspected medically to have toxic biological effects. The cowl is intended to dissipate this radiation.

In short, the combination of elements forming this structure is such as to minimize the risk of total radiation and other factors which can affect the user of the VDT in a deleterious physiological manner. Also, the resulting reduction in glare and static charge about the VDT enhances the user acceptance and minimizes what is becoming accepted as a risk to health causes by the standing static charge around the VDT.

Figure 6:
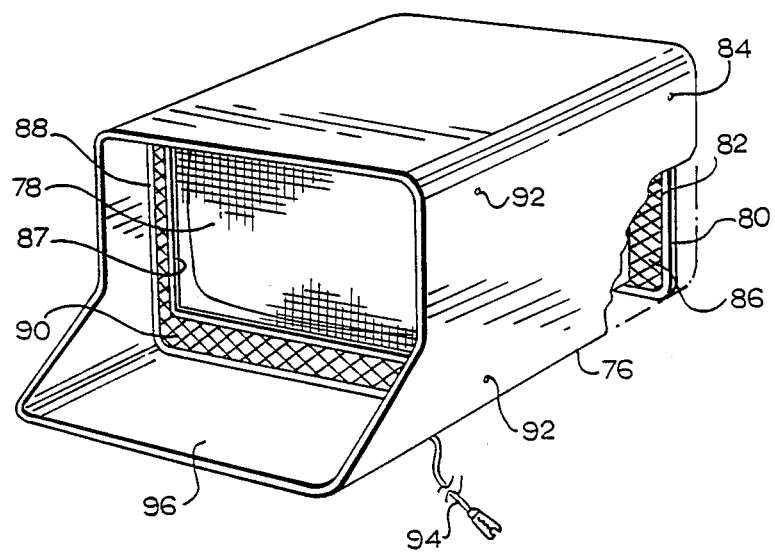
FIG. 6 is a perspective view of a second embodiment of the invention which encloses the VDT.

The embodiment shown in FIG. 1 will provide best results when used with a VDT having a metal case. Such a case will combine with the inventive structure to absorb radiation and minimize operator exposure. When the VDT includes a non-conductive synthetic plastic housing, a preferred embodiment is that shown in FIG. 6. A fabricated housing 76 of SAE 1010 steel has a thickness of about 0.0036 inch and is open at the front and back. The housing is proportioned to receive a variety of VDT sizes (such as VDT 78) which sit inside the housing and insulated from the housing. A back cover 80 is shaped to fit snugly in the housing and includes a frame 82 which receives screws 84 (one of which is shown) to hold the cover in place. The frame 82 carries a conductive metal mesh 86 which is of course shaped to permit cable attachments to the VDT.

The front of VDT 78 is covered by structure 86 similar to structure 22 (FIG. 2) but without the cowl 40. Structure 86 is contained within an outer frame 88 similar to frame 82 and set back from the front of the housing so that this part of the housing forms a shroud. Frame 82 is held in place by conductive heavy metal mesh 90. The resulting front assembly is retained in place within the housing 76 by screws 92, two of which are shown, and the complete assembly is grounded via a suitable strap 94.

The housing is conveniently shaped with a front apron 96 which serves both to absorb the pulsed electromagnetic radiation and to provide support for a separate keyboard. Clearly the shape of the housing can be varied to suit different VDTs with or without integral keyboards. The shaping should include space to permit air movement through the spaces between the housing and the VDT.

The housing and shroud used in FIG. 1 may be of any steel which has suitable conduction and magnetic permeability characteristics similar to those of SAE 1010 grade steel.

It will be clear that the structures described are exemplary and could be modified within the scope of the preferred embodiment of the invention. Further, a VDT could be structured to include these elements as part of the package rather than as an attachment in the manner shown in the drawings. All of these variations are within the scope of the invention.

I claim:

1. Structure for reducing potentially harmful effects emanating from a video display terminal having a screen on a cathode ray tube, the structure comprising:

a light-transparent first medium proportioned to cover the screen and being of a material capable of absorbing ionizing radiation including X-rays, gamma rays and higher frequencies of ultraviolet radiation, the medium being positioned immediately adjacent the screen;

an electrically conductive second medium exposed to the viewer and proportioned to cover the first medium and being sufficiently light transparent to permit normal viewing of visual displays on the screen, the second medium being of a material capable of reacting with non-ionizing radiation to dissipate this radiation, the second medium being substantially non-reflective to minimize glare caused by reflected light from surrounding illumination; and frame means holding the first and second mediums in proximity one with the other and including discharge means for coupling the second medium to ground to dissipate electrical charges developed in the structure.

2. Structure as claimed in claim 1 further comprising an electrically conductive cowl coupled to the frame means and extending orthogonally with respect to the first and second media for creating a conductive barrier in the field of very low frequency radiation for inducing charge from this low frequency radiation, such induced charge being dissipated by said discharge means to thereby reduce the effects of the very low frequency radiation.

3. Structure as claimed in claim 1 in which the first medium is of boron silicate glass, having a thickness of about 6 mm.

4. Structure as claimed in claim 1 in which the second medium is a screen of black oxidized stainless steel having about 100 to 200 threads per inch.

5. Structure as claimed in claim 1 in which the second medium is a screen of black oxidized stainless steel having about 180 threads per inch of diameter about 0.0018 inches.

6. In a video display terminal having a source of electrons impinging on a phosphor coating to create a human-readable image, the improvement in which a structure is placed between the image and the user, the structure comprising:

a light-transparent first medium proportioned to cover the image and being of a material capable of absorbing ionizing radiation including X-rays, gamma rays, and higher frequencies of ultraviolet radiation, the medium being positioned immediately adjacent the screen;

an electrically conductive second medium exposed to the viewer and proportioned to cover the first medium and being sufficiently light transparent as not to interfere significantly with the viewing of the image, the second medium being of a material capable of reacting with non-ionizing radiation to create an electrical charge in the medium, the second medium being substantially non-reflective to minimize glare caused by reflected light from surrounding illumination; and frame means holding the first and second mediums in proximity one with the other and including discharge means for coupling the second medium to ground to dissipate electrical charges developed in the structure.

7. Apparatus for containing a video display device having a screen to contain and dissipate ionizing and non-ionizing radiations emanating from the device in use, the apparatus comprising:

a housing proportioned to contain the display device, the housing being of conductive steel sheet having good magnetic permeability and having open front and back;

a rear conductive mesh coupled to the housing at the back of the housing to serve as a barrier to minimize the emission of magnetic flux;

frame means at the front of the housing and coupled to the housing, the frame means including a medium positioned to cover the screen in proximity with the screen and capable of absorbing ionizing radiation, an electrically conductive fine mesh exposed to the viewer and extending across said medium and the screen to reduce glare caused by reflection from surrounding illumination and to dissipate non-ionizing radiation emanating from the display device in the region of the screen, and a front conductive mesh extending outwardly of the fine mesh and serving as a front magnetic flux barrier; and a grounding strap coupled electrically to the housing, the fine mesh and the front and rear meshes to cause said dissipation of the radiations emanating from the display device.

8. Structure as claimed in claim 6 in which the first medium is of boron silicate glass.

9. Structure as claimed in claim 8 in which the boron silicate glass has a thickness of about 6 millimeters.

10. Structure as claimed in claim 1 in which first medium is of boron silicate glass.

11. Apparatus as claimed in claim 7 in which said medium is of boron silicate glass.

12. Apparatus as claimed in claim 11 in which the boron silicate glass has a thickness of about 6 millimeters.

13. Structure as claimed in claim 6 in which the second medium is a screen of black oxidized stainless steel.

14. Structure as claimed in claim 7 in which the second medium is a screen of black oxidized stainless steel.

* * * * *